US006614397B2

(12) United States Patent
Pullen et al.

(10) Patent No.: US 6,614,397 B2
(45) Date of Patent: Sep. 2, 2003

(54) WRONG RUNWAY ALERT SYSTEM AND METHOD

(75) Inventors: Charles A. Pullen, Bellevue, WA (US); Henry V. VonJouanne, Woodinville, WA (US); Andrew W. Houck, Woodinville, WA (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 10/001,398

(22) Filed: Nov. 14, 2001

(65) Prior Publication Data

US 2003/0090420 A1 May 15, 2003

(51) Int. Cl.[7] .......................... G01S 3/02; G08B 21/00; G08G 5/00; G08G 5/04

(52) U.S. Cl. ...................... 342/456; 340/945; 340/959; 340/961

(58) Field of Search ................................ 342/454–456, 342/357.08, 357.07, 357.17; 340/959, 945, 961; 701/301

(56) References Cited

U.S. PATENT DOCUMENTS

| | | | |
|---|---|---|---|
| 5,374,932 A | 12/1994 | Wyschogrod et al. | |
| 5,499,025 A * | 3/1996 | Middleton et al. | 340/959 |
| 5,519,618 A | 5/1996 | Kastner et al. | |
| 5,557,278 A | 9/1996 | Piccirillo et al. | |
| 5,712,785 A | 1/1998 | Mok et al. | |
| 5,877,721 A | 3/1999 | Tsang et al. | |
| 5,920,318 A | 7/1999 | Salvatore, Jr. et al. | |
| 6,182,005 B1 * | 1/2001 | Pilley et al. | 701/301 |
| 6,216,064 B1 | 4/2001 | Johnson et al. | |
| 6,381,541 B1 * | 4/2002 | Sadler | 701/301 |
| 2002/0080046 A1 * | 6/2002 | Derringer | 340/945 |

OTHER PUBLICATIONS

2001 Federal Radionavigation Plan, DOT–VNTSC–R-SPA–01–3 / DoD–4650.5, 2001.*

Registration Procedures For Landing Areas In Alabama, J.C. Eagerton, http://www.dot.state.al.us/bureau/aeronautics/web_forms/registration_procedures_for_landing_areas.pdf, Dec. 2000.*

Surface surveillance systems using point sensors and segment–based tracking, E. Chartier et al., 20th Conference on Digital Avionics Systems, vol. 1, p. 2E1/1–2E1/8, 2001.*

* cited by examiner

*Primary Examiner*—Thomas H. Tarcza
*Assistant Examiner*—F H Mull
(74) *Attorney, Agent, or Firm*—Black Lowe & Graham PLLC

(57) ABSTRACT

A system and method are provided for automatically alerting a flight crew of an airplane when takeoff is attempted on a wrong runway. Identification data for an origin runway from which takeoff of an airplane is desired is entered via an operator interface. Stored position data for the origin runway is retrieved. Sensed position data for the airplane is input from a plurality of sensors. The stored position data for the origin runway is compared with the sensed position data for the airplane. A determination is made whether the sensed position of the airplane is within a predetermined position difference from the stored position of the origin runway, and a determination is made whether takeoff is attempted. An indication of wrong runway is provided when takeoff is attempted and the sensed position of the airplane is greater than the predetermined position difference away from the stored position of the origin runway.

42 Claims, 2 Drawing Sheets

WRONG RUNWAY ALERT SYSTEM AND METHOD

FIELD OF THE INVENTION

This invention relates generally to avionics, and in particular to a method and system of alerting a flight crew of an aircraft when takeoff is attempted on a wrong runway.

BACKGROUND OF THE INVENTION

From time to time, flight crews occasionally take off or land an aircraft on a runway that is closed. Currently, visual detection by the flight crew is the only known method available to a flight crew for determining whether a runway from which takeoff is being attempted is the correct runway. Visual detection of whether or not a runway is the correct runway can be impeded by factors that are outside the control of the flight crew, such as darkness, insufficient runway lighting, and severe rain or snow.

Over 250 incidents involving wrong runways have been reported since the mid-1980s. As a result, the National Transportation Safety Board has indicated that runway safety is an area of desirable safety improvements.

Thus, there is an unmet need in the art for a system and method for automatically alerting a flight crew of an airplane when takeoff is attempted on a wrong runway.

SUMMARY OF THE INVENTION

A system and method are provided for automatically alerting a flight crew of an airplane when takeoff is attempted on a wrong runway.

According to one aspect of the present invention, a method is provided for automatically alerting a flight crew of an airplane when takeoff is attempted on a wrong runway. The method includes entering identification data for an origin runway from which takeoff of an airplane is desired. Stored position data for the origin runway is retrieved. Sensed position data for the airplane is input. The stored position data for the origin runway is compared with the sensed position data for the airplane. A determination is made whether the sensed position of the airplane is within a predetermined position difference from the stored position of the origin runway, and a determination is made whether takeoff is attempted. An indication of wrong runway is provided when takeoff is attempted and the sensed position of the airplane is greater than the predetermined position difference away from the stored position of the origin runway.

According to another aspect of the present invention, a system is provided for automatically alerting a flight crew of an airplane when takeoff is attempted on a wrong runway. The system includes means for entering identification data for an origin runway from which takeoff of an airplane is desired. The system further includes means for retrieving stored position data for the origin runway, and means for sensing position data for the airplane. Means for comparing the stored position data for the origin runway with the sensed position data of the airplane are provided. The system also includes means for determining whether the sensed position of the airplane is within a predetermined position difference from the stored position of the origin runway, as well as means for determining whether takeoff is attempted. Also included are means for providing an indication of wrong runway when takeoff is attempted and the sensed position of the airplane is greater than the predetermined position difference away from the stored position of the origin runway.

According to further aspects of the present invention, stored position data for the origin runway and the sensed position data for the airplane include latitude and longitude data. Additionally, the stored position data for the origin runway includes azimuthal bearing of the origin runway, and the sensed position data for the airplane includes airplane heading data.

BRIEF DESCRIPTION OF THE DRAWINGS

The preferred and alternative embodiments of the present invention are described in detail below with reference to the following drawings.

DETAILED DESCRIPTION OF THE INVENTION

The present invention provides a system and method for automatically alerting a flight crew of an airplane when takeoff is attempted on a wrong runway. Identification data for an origin runway from which takeoff of an airplane is desired is entered. Stored position data for the origin runway is retrieved. Sensed position data for the airplane is input. The stored position data for the origin runway is compared with the sensed position data for the airplane. A determination is made whether the sensed position of the airplane is within a predetermined position difference from the stored position of the origin runway, and a determination is made whether takeoff is attempted. An indication of wrong runway is provided when takeoff is attempted and the sensed position of the airplane is greater than the predetermined position difference away from the stored position of the origin runway.

Figure 1:
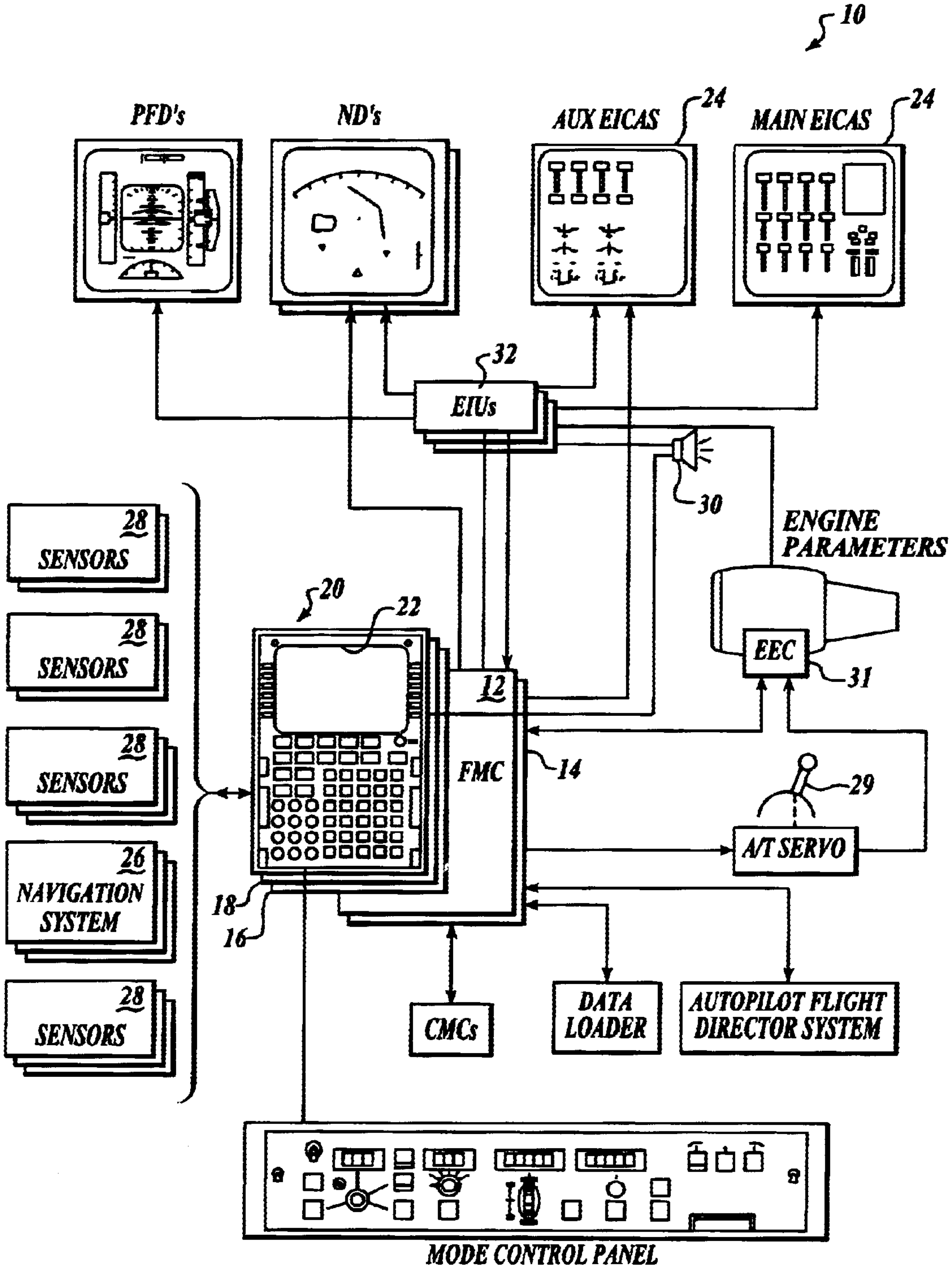
FIG. 1 is a block diagram of a system according to the present invention.

FIG. 1 shows a system 10 for automatically alerting a flight crew of an airplane (not shown) when takeoff is attempted on a wrong runway. The system 10 includes a computer 12. The computer 12 is any acceptable flight computer that is known in the art, and suitably includes a processor 14 and a memory device 16. The processor 14 is any acceptable processor that is suitable for performing aircraft flight management operations and arithmetic computations, such as an Intel Pentium-series processor or any similar processor. The memory device 16 is suitably a non-volatile memory device, such as read-only memory (ROM), programmable read-only memory (PROM), erasable programmable read-only memory (EPROM), or electrically erasable programmable read-only memory (EEPROM). Alternatively, the memory function of the memory device 16 may be provided by storage 18, such as a hard disk drive, a floppy disk drive, a compact disk (CD) ROM, zip drive, or the like. In addition to providing functionality for the present invention, the computer 12 may allow pre-planned flight profile control and guidance for optimizing performance and performance management. The computer 12 may calculate lateral and vertical components of a flight, and send commands to other aircraft systems so the other aircraft systems may follow the flight plan. Because the computer 12 is suitably any computer known in the art, a detailed discussion of the construction and operation of the computer 12 is not necessary for an understanding of the present invention.

According to an embodiment of the present invention, position data for airport and airport runways is maintained in a navigation database that is resident on the computer 12.

The navigation database may be stored in the memory device 16. Alternatively, the navigation database may be stored in storage 18, as desired. According to one embodiment of the invention, the navigation database is loaded into the computer 12 and is updated periodically by the supplier of the navigation database. An example of an acceptable navigation database is defined by industry standard ARINC-424 and is currently available from Jeppeson Sanderson, Inc., and updated by the supplier approximately every 28 days. The navigation database suitably includes information regarding worldwide airports and airport runways. Specifically, the navigation database includes latitude and longitude coordinates for runways as measured at centerline of each runway. Further, the navigation database includes heading information, that is azimuthal bearing data, for each runway.

An operator interface 20 is arranged to provide operator input to the computer 12, and specifically to the processor 14. The operator interface 20 is suitably any acceptable interface device known in the art, such as, a keypad, a keyboard, or a pointing device such as a mouse, a track ball, or a touch pad.

A monitor 22 may be used in conjunction with the operator interface 20 to enable the operator to enter data to the computer 12. The monitor 22 is arranged to receive visual output signals from the processor 14. In addition to permitting an operator to input data to the computer 12, in one embodiment of the invention the monitor 22 also suitably provides a visual alert to the operator when a takeoff is attempted on a wrong runway. Thus, in this embodiment the monitor 22 suitably provides visual indication to the operator for entry and selection functions and also for wrong runway alert functions. Alternatively, in another embodiment of the invention, one or more additional monitors 24 may be provided. When the monitors 22 and 24 are provided, one of the monitors 22 or 24 as desired may be dedicated to monitoring entry and selection. In one embodiment, the operator interface 20 is a control-display unit that includes a keypad or a pointing device or the like along with the monitor 22, as is known in the art. In this alternate embodiment, the other monitors 24 may be dedicated to providing a visual alert to the operators that takeoff is being attempted on a wrong runway. In one embodiment, the monitors 24 are included in a crew alert system as is known in the art.

A navigation system 26 provides position data to the computer 12 and, specifically to the processor 14. The navigation system 26 suitably provides accurate longitude and latitude data from any acceptable onboard navigation system. It will be appreciated that position uncertainty of the navigation system 26 should be minimized in order to maximize accuracy of position fixes of the airplane as defined by longitude and latitude data. For example, one embodiment of the invention provides Global Positioning System (GPS) data. As is known, GPS data includes, among other data, latitude and longitude data as well as position uncertainty data. As is also known, GPS position uncertainty, or Horizontal Integrity Limit (HIL), varies according to the number of GPS satellites used for a fix and the geometry defined by the satellites used. However, other onboard navigation systems, such as LORAN, are also acceptable.

A plurality of sensors 28 provide data to the computer 12, and specifically to the processor 14, for various aircraft parameters. For example, an inertial reference unit, a gyrocompass, or any other acceptable heading sensor provides aircraft heading data to the processor 14. If desirable, an indication of whether or not the aircraft is on the ground may be provided to the processor 14. An indication of whether or not an aircraft is on the ground is suitably provided in any known manner, such as from a proximity switch electronics unit that receives signals from proximity switches mounted on landing gear of the aircraft. When an aircraft is on the ground, compression of the landing gear causes proximity switches located on the landing gear to cause the proximity switch electronics unit to send signals indicative of the aircraft being on the ground. To determine whether takeoff is being attempted, ground speed data may be provided to the processor 14. Ground speed may be sensed in any known manner, including sensing by a GPS system or an inertial system, such as an accelerometer. An indication that takeoff is being attempted is also suitably sensed by sensing angular position of thrust levers 29. For example, when the thrust levers 29 are placed in a takeoff position, a signal is sent to the processor 14. An indication that takeoff is being attempted is also suitably sensed by monitoring engine thrust data, such as engine rotor speed N1. As is known, engine thrust data, such as engine rotor speed N1 is monitored by engine control unit 31. The engine control unit 31 is acceptably any suitable engine control unit that is known in the art and performs known functions such as monitoring engine rotor speed N1. Engine rotor speed N1 is provided by the engine control unit 31 to the processor 14. Typically, engine thrust data such as an engine rotor speed N1 on the order of 60%–70% of maximum engine rotor speed or greater is generally indicative of an attempted takeoff.

An aural warning device 30 receives an output signal from the processor 14 and provides an alert to the flight crew that a takeoff is being attempted on a wrong runway. The aural warning device 30 suitably receives the output signal directly from the processor 14. In another embodiment, a warning electronics system 32, well known in the art of commercial air transports, receives the warning signal from the processor 14. In this embodiment, the aural warning device 30 receives its input signal from the warning electronics system 32. The aural warning device 30 is suitably any acceptable device that provides an audio output. The aural warning device 30 suitably includes a loudspeaker, a buzzer, a horn, a siren, or the like. As is known, the aural warning device 30 may be housed in any suitable display system located within the flight deck, if desired. Alternately, the aural warning device 30 may be housed as a standalone unit. The aural warning is suitably any warning tone, sound, or noise. If desired, the aural warning may be a spoken warning of "wrong runway" provided, for example, by playback of a .wav file by the processor 14.

Figure 2:
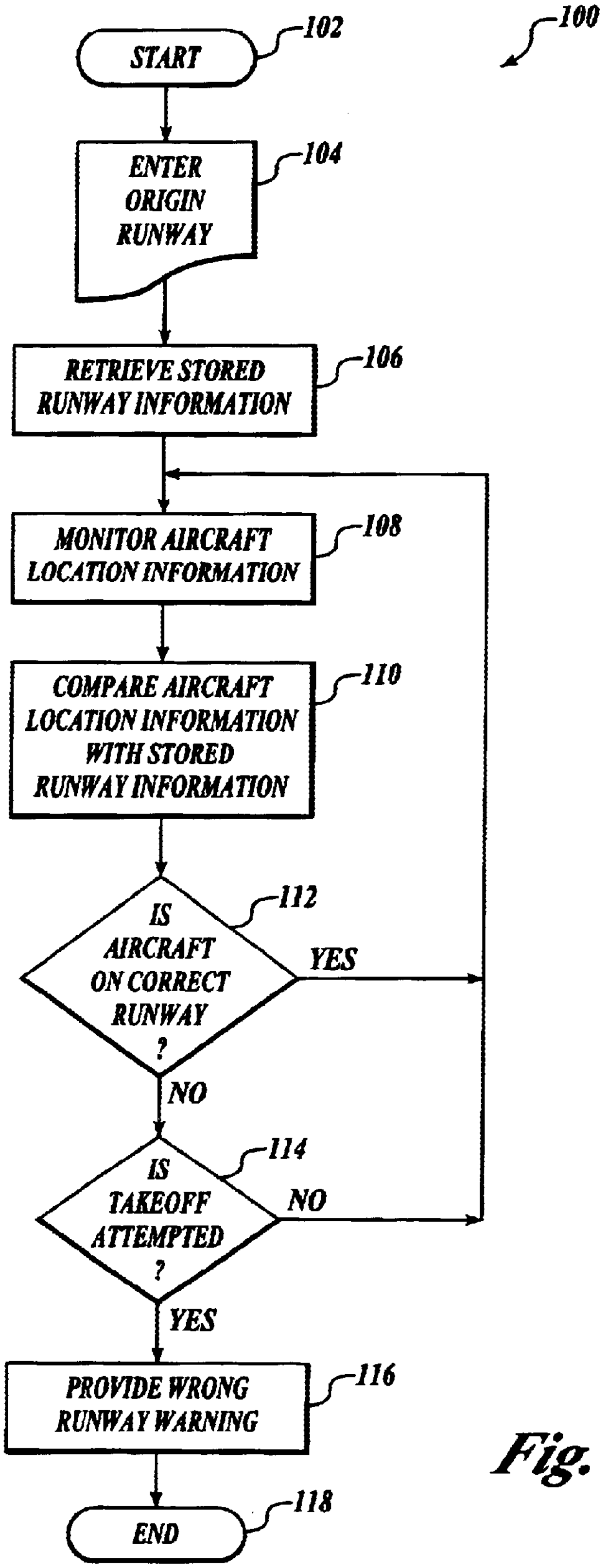
FIG. 2 is a flow chart of a method according to the present invention.

FIG. 2 shows a flow chart of a method 100 of automatically alerting a flight crew of an airplane when takeoff is attempted on a wrong runway. Referring to FIGS. 1 and 2, the method 100 is suitably a software routine that is implemented by the computer 12 and uses operator input from the operator interface 20, as well as position input from the navigation system 26 and sensory input from the sensors 28.

The method starts at a block 102. At a block 104, the flight crew enters identification data for an origin runway from which takeoff of the airplane is desired. The flight crew enters the identification data for the origin runway via the operator interface 20. If runway clearance changes prior to takeoff, the flight crew would reenter the new origin runway via the operator interface 20.

Once identification data for the origin runway is entered via the operator interface 20, stored runway information is retrieved from the memory device 16 or from storage 18, as appropriate, at a block 106. The retrieved stored location data for the origin runway includes latitude and longitude of runway centerline. The retrieved stored location data for the origin runway also includes heading information, that is azimuthal bearing orientation, for the origin runway.

At a block 108, sensor data from the aircraft is monitored. For example, sensor data is provided from the plurality of sensors 28 to the processor 14 to indicate whether the airplane is on the ground. Aircraft heading information is also provided. An indication of whether or not takeoff is attempted is also provided by monitoring ground speed of the airplane, or thrust lever 29 angular position, or engine thrust data as described above. It will be appreciated that the block 108 represents a monitoring function of aircraft sensors. As such, the block 108 may be performed continuously. Alternatively, the block 108 is performed at periodic intervals, such as one-second intervals or intervals of any time period as desired.

At a block 110, the stored location data for the origin runway is compared with the sensed location data for the airplane. The comparison is performed by the processor 14.

At a decision block 112, the processor 14 makes a determination whether the aircraft is on the correct runway. According to an embodiment of the invention, the processor 14 inputs GPS position and GPS position uncertainty, also known as GPS horizontal integrity limit (HIL). The processor 14 compares the GPS position and position uncertainty with cross-track distance from centerline of the origin runway. According to an embodiment of the invention, if GPS position is farther from centerline of the origin runway than GPS HIL, then a determination is made that the aircraft is on the wrong runway.

Alternatively, according to another embodiment of the invention, if the GPS position is greater than a predetermined distance from centerline of the origin runway, then a determination is made that the aircraft is on the wrong runway. The predetermined distance may be any distance selected as desired based upon a trade between detection probability and avoidance of false alarms. For example, the predetermined distance may be based upon approximating distance from centerline of a typical runway. When an airplane is on an origin runway, the airplane will be within the predetermined distance from centerline of the origin runway. A typical runway may have a width of between 200–250 feet. Thus, a distance from centerline of a typical runway to an edge of the runway is between 100–125 feet. As such, the predetermined distance may have a value on the order of 100 feet, or 125 feet, or other values as desired to achieve a balance between detection probability and avoidance of false alarms.

At the block 112, the processor 14 also makes a determination of wrong runway based upon azimuthal data. The processor 14 compares sensed aircraft heading with the stored runway azimuthal bearing data from the navigation database. When the aircraft heading differs from the runway azimuthal bearing by greater than a predetermined azimuthal difference, the processor 14 determines that the aircraft is on the wrong runway. It will be appreciated that the aircraft may be located on the desired origin runway, but the aircraft may be at the wrong end of the runway. That is, the aircraft heading is 180 degrees from the desired takeoff heading. In such a case, a determination is made at the block 112 that the aircraft is on the wrong runway. As discussed above regarding the predetermined distance from centerline of the origin runway, the predetermined azimuthal difference is selected based upon a trade between mitigating improbable nuisance false alarms with ensuring detection probability of wrong runway determination. It is desirable that the predetermined azimuthal difference allow for any slight errors that may exist in the navigation database between stored runway azimuthal bearing and actual runway azimthal bearing. Further, it is also desirable that the predetermined azimuthal difference allow for any accuracy limitations of heading sensors. As a further example, it is desirable that the predetermined azimuthal difference allow for operational flexibility of an aircraft, such as performance of a rolling takeoff on the origin runway. In the example of a rolling takeoff, takeoff thrust (or near-takeoff thrust) is applied during a turn onto the origin runway. Thus, the greater the value of the predetermined azimuthal difference, the lower the number of nuisance false alarms due to system limitations and expected operational maneuvers of the aircraft. Given by way of non-limiting example only, a current embodiment of the invention includes a predetermined azimuthal difference of approximately 30 degrees. It will be appreciated that any predetermined azimuthal difference may be selected as desired, depending upon a balancing of mitigation of false alarm rate with enhancement of detection probability of wrong runway determination.

At the decision block 112, if a determination is made that the aircraft is on the correct runway, then the method returns the block 108 for monitoring of aircraft information by the plurality of sensors 28. If at the decision block 112 a determination is made that the aircraft is not on the correct runway, that is the aircraft is on the wrong runway, the method proceeds to a decision block 114 where a determination is made whether takeoff is attempted.

As discussed above, the processor 14 monitors inputs from the plurality of sensors 28 regarding ground speed, thrust lever 29 position, or engine thrust data, as desired. At the decision block 114, a determination is made whether a takeoff is attempted. For example, a takeoff attempt may be indicated when the thrust levers 29 are placed in the takeoff position. Alternatively, a determination is made at the decision block 114 that takeoff is being attempted when ground speed is greater than a typical taxi speed, such as, for example, around 30 knots. In one embodiment of the invention, a determination is made that takeoff is attempted when engine rotor speed N1 is on the order of about 60%–70% of maximum engine rotor speed. If a determination is made at the decision block 114 that take off is not being attempted, the method returns to block 108.

If a determination is made at the decision block 114 that takeoff is being attempted, the method proceeds to a block 116 where a wrong runway alert is provided. At the block 116, the alert may be provided as visual output at either of the monitors 22 or 24. The visual output suitably includes any acceptable visual indication of a wrong runway, such as a large X or an international slash circle superimposed over a runway symbol. Other optional visual alert signals include a text indication of "WRONG RUNWAY", "RUNWAY DISAGREE", or a visual symbol of a stop sign or the like.

If desired, at the block 116 aural warning of wrong runway may be provided. As discussed above, the aural warning system 30 provides an aural indication of wrong runway, such as a voice message of "wrong runway" or "runway disagree." Alternatively, the block 116 causes the aural warning system 30 to provide an audible warning, such as a noise from a buzzer, siren, bell, or any other acceptable noisemaker.

The method ends at a block 118 when the aircraft reaches or exceeds its decision speed V1, that is the speed at which stopping the aircraft on the remaining runway is no longer possible. As is known, decision speed V1 varies with factors such as aircraft type, engine type, takeoff weight, and other factors. Therefore, in one embodiment of the invention, the method ends at the block 118 when the aircraft reaches or exceed a predetermined threshold speed. The predetermined threshold speed suitably approximates the decision speed V1. That is, the predetermined threshold speed is suitably high enough such that stopping the aircraft on the remaining runway is substantially no longer possible. For example, such a suitable predetermined threshold speed is on the order of about 80 knots. However, it will be appreciated that the predetermined threshold speed may be selected as desired for a particular application. Alternately, in another embodiment of the invention, the method ends at the block 118 when the airplane is no longer sensed on the ground and is sensed in the air using known air/ground sensing methods.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of automatically alerting a flight crew of an airplane when takeoff is attempted on a wrong runway, the method comprising:

entering identification data for an origin runway from which takeoff of an airplane is desired;

retrieving stored position data for the origin runway;

inputting sensed position data for the airplane;

comparing the stored position data for the origin runway with the sensed position data for the airplane;

determining whether the sensed position of the airplane is within a predetermined position difference from the stored position of the origin runway;

determining whether takeoff is attempted; and providing an indication of wrong runway when takeoff is attempted and the sensed position of the airplane is greater than the predetermined position difference away from the stored position of the origin runway.

2. The method of claim 1, wherein the stored position data for the origin runway and the sensed position data for the airplane include latitude and longitude data.

3. The method of claim 2, wherein the latitude and longitude data for the origin runway are measured at centerline of the origin runway.

4. The method of claim 3, wherein the sensed position data includes LORAN input.

5. The method of claim 3, wherein the sensed position data includes GPS input.

6. The method of claim 5, wherein the predetermined position difference includes maximum horizontal integrity limit of GPS.

7. The method of claim 2, wherein the predetermined position difference includes a distance from centerline of the origin runway to an edge of the origin runway.

8. The method of claim 7, wherein the distance from centerline of the origin runway to an edge of the origin runway is in the range of about 100–125 feet.

9. The method of claim 1, wherein the stored position data includes azimuthal bearing of the origin runway and the sensed position data includes airplane heading data, and wherein the predetermined position difference is a predetermined azimuthal difference between the azimuthal bearing of the origin runway and the airplane heading.

10. The method of claim 9, wherein the predetermined azimuthal difference is approximately 30 degrees.

11. The method of claim 1, wherein determining whether takeoff is attempted includes:

sensing ground speed; and determining whether ground speed is greater than taxi speed.

12. The method of claim 1, wherein determining whether takeoff is attempted includes:

sensing thrust lever position; and determining whether thrust lever position is in a takeoff position.

13. The method of claim 1, wherein determining whether takeoff is attempted includes:

sensing engine thrust; and determining whether sensed engine thrust is indicative of takeoff thrust.

14. The method of claim 13, wherein engine rotor speed is sensed; and sensed engine thrust is indicative of takeoff thrust when the engine rotor speed is in a range of about 60%–70% of maximum engine rotor speed.

15. A system for automatically alerting a flight crew of an airplane when takeoff is attempted on a wrong runway, the system comprising:

means for entering identification data for an origin runway from which takeoff of an airplane is desired;

means for retrieving stored position data for the origin runway;

means for sensing position data for the airplane;

means for comparing the stored position data for the origin runway with the sensed position data of the airplane;

means for determining whether the sensed position of the airplane is within a predetermined position difference from the stored position of the origin runway;

means for determining whether takeoff is attempted; and means for providing an indication of wrong runway when takeoff is attempted and the sensed position of the airplane is greater than the predetermined position difference away from the stored position of the origin runway.

16. The system of claim 15, wherein the stored position data for the origin runway and the sensed position data for the airplane include latitude and longitude data.

17. The system of claim 16, wherein the latitude and longitude data for the origin runway are measured at centerline of the origin runway.

18. The system of claim 17, wherein the sensed position data includes LORAN data.

19. The system of claim 17, wherein the sensed position data includes GPS data.

20. The system of claim 19, wherein the predetermined position difference includes horizontal integrity limit of GPS.

21. The system of claim 16, wherein the predetermined position difference includes a distance from centerline of the origin runway to an edge of the origin runway.

22. The system of claim 21, wherein the distance from centerline of the origin runway to an edge of the origin runway is in the range of about 100–125 feet.

23. The system of claim 15, wherein the stored position data includes azimuthal bearing of the origin runway and the sensed position data includes airplane heading data, and wherein the predetermined position difference is a predetermined azimuthal difference between the azimuthal bearing of the origin runway and the airplane heading.

24. The system of claim 23, wherein the predetermined azimuthal difference includes an azimuthal difference of approximately 30 degrees.

25. The system of claim 15, wherein the means for determining whether takeoff is attempted includes means for measuring ground speed.

26. The system of claim 15, wherein the means for determining whether takeoff is attempted includes means for determining thrust lever position.

27. The system of claim 15, wherein the means for determining whether takeoff is attempted includes means for sensing engine thrust.

28. The system of claim 27, wherein the engine thrust sensing means senses engine rotor speed.

29. A system for automatically alerting a flight crew of an airplane when takeoff is attempted on a wrong runway, the system comprising:

a user interface configured for a flight crew to enter identification data for an origin runway from which takeoff of an airplane is desired;

a memory device onboard the airplane, the memory device being configured to store position data for the origin runway;

a plurality of sensors onboard the airplane, the plurality of sensors being configured to sense position data for the airplane; and a processor onboard the airplane, the processor including:

a first component configured to compare the stored position data for the origin runway with the sensed position data of the airplane;

a second component configured to determine whether the sensed position of the airplane is within a predetermined position difference from the stored position of the origin runway; and a third component configured to determine whether takeoff is attempted; and an indicator onboard the airplane, the indicator being configured to provide the flight crew with an indication of wrong runway when takeoff is attempted and the sensed position of the airplane is greater than the predetermined position difference away from the stored position of the origin runway.

30. The system of claim 29, wherein the stored position data for the origin runway and the sensed position data for the airplane include latitude and longitude data.

31. The system of claim 30, wherein the latitude and longitude data for the origin runway are measured at centerline of the origin runway.

32. The system of claim 31, wherein the sensed position data includes LORAN data.

33. The system of claim 31, wherein the sensed position data includes GPS data.

34. The system of claim 33, wherein the predetermined position difference includes horizontal integrity limit of GPS.

35. The system of claim 30, wherein the predetermined position difference includes a distance from centerline of the origin runway to an edge of the origin runway.

36. The system of claim 35, wherein the distance from centerline of the origin runway to an edge of the origin runway is in the range of about 100–125 feet.

37. The system of claim 29, wherein the stored position data includes azimuthal bearing of the origin runway and the sensed position data includes airplane heading data, and wherein the predetermined position difference is a predetermined azimuthal difference between the azimuthal bearing of the origin runway and the airplane heading.

38. The system of claim 37, wherein the predetermined azimuthal difference includes an azimuthal difference of approximately 30 degrees.

39. The system of claim 29, wherein the third component is further configured to input ground speed.

40. The system of claim 29, wherein the third component is further configured to input thrust lever position.

41. The system of claim 29, wherein the third component is further configured to input sensed engine thrust.

42. The system of claim 41, wherein the sensed engine thrust includes sensed engine rotor speed.

* * * * *